(12) United States Patent
Blanchard et al.

(10) Patent No.: US 9,453,588 B2
(45) Date of Patent: Sep. 27, 2016

(54) VALVE ASSEMBLY INCLUDING PRESSURE RELIEF MECHANISM

(71) Applicant: Marshall Excelsior Co., Marshall, MI (US)

(72) Inventors: Frederick W. Blanchard, Battle Creek, MI (US); Alex L. Hoffman, Bellevue, MI (US)

(73) Assignee: MARSHALL EXCELSIOR CO., Marshall, MI (US)

(*) Notice: Subject to any disclaimer, the term of this patent is extended or adjusted under 35 U.S.C. 154(b) by 0 days.

(21) Appl. No.: 14/207,768

(22) Filed: Mar. 13, 2014

(65) Prior Publication Data

US 2014/0261817 A1 Sep. 18, 2014

Related U.S. Application Data

(60) Provisional application No. 61/783,900, filed on Mar. 14, 2013.

(51) Int. Cl.
*F16K 39/02* (2006.01)
*F16K 1/20* (2006.01)

(52) U.S. Cl.
CPC ........... *F16K 39/024* (2013.01); *F16K 1/2007* (2013.01); *F16K 1/2014* (2013.01); *Y10T 137/86976* (2015.04); *Y10T 137/86984* (2015.04)

(58) Field of Classification Search
CPC .................................................. F16K 39/024
USPC ................. 137/630, 630.14, 630.15, 630.19; 251/281, 297
See application file for complete search history.

(56) References Cited

U.S. PATENT DOCUMENTS

| | | | |
|---|---|---|---|
| 100,481 A | 3/1870 | Wilson | |
| 130,411 A | 8/1872 | Chappell | |
| 167,751 A | 9/1875 | Earle | |
| 1,020,022 A | 3/1912 | Burke | |
| 1,084,041 A | 1/1914 | Seager | |
| 1,112,135 A | 9/1914 | Harkom | |
| 1,147,242 A | 7/1915 | Hentschel | |
| 1,314,609 A | 9/1919 | Sault | |
| 1,369,137 A | 2/1921 | Simmons | |
| 1,602,236 A | 10/1926 | Marscheider et al. | |
| 2,999,666 A | 9/1961 | Sjögren | |
| 3,119,594 A | 1/1964 | Heggem | |
| 3,136,338 A | 6/1964 | Hamer | |
| 8,596,301 B2 | 12/2013 | Zuck et al. | |
| 2012/0132294 A1* | 5/2012 | Hoffman et al. | ............. 137/383 |

* cited by examiner

*Primary Examiner* — R.K. Arundale
(74) *Attorney, Agent, or Firm* — Howard & Howard Attorneys PLLC

(57) ABSTRACT

A valve assembly includes a housing having a first chamber, a second chamber, a valve seat disposed between the first chamber and the second chamber, a valve head disposed in the housing and moveable relative to the housing, a valve stem operatively coupled to the valve head for moving the valve head between the open and closed positions, and a pressure relief mechanism including a plug coupled to the valve stem and extending along a plug axis in the bore of the valve head moveable relative to the valve head from a sealed position preventing fluid communication through the bore to an unsealed position allowing fluid communication through the bore for relieving pressure differences between the first chamber and the second chamber when the valve head is in the closed position.

20 Claims, 14 Drawing Sheets

VALVE ASSEMBLY INCLUDING PRESSURE RELIEF MECHANISM

CROSS-REFERENCE TO RELATED APPLICATION(S)

The present invention claims priority to and the benefit of U.S. Provisional Patent Application Ser. No. 61/783,900, filed Mar. 14, 2013, which is hereby incorporated by reference in its entirety.

BACKGROUND OF THE INVENTION

1. Field of the Invention

The present invention relates generally to valve assemblies and, more specifically to, a valve assembly including a pressure relief mechanism for relieving pressure between pipes prior to opening of the valve assembly.

2. Description of the Related Art

Valve assemblies are used for regulating flow between pipes in a fluid pipeline system. Typically, these valve assemblies include a housing having a first chamber, a second chamber, and a valve seat disposed between the first chamber and the second chamber. The valve assemblies also include a valve head disposed in the housing and being moveable relative to the housing between an open position spaced from the valve seat and a closed position engaged with the valve seat.

Valve assemblies are commonly used in a fluid pipeline system that can have a bidirectional flow. When the valve head is in the closed position, the fluid can exert a pressure against a front portion and/or a back portion of the valve head to create a pressure differential between the front portion and the back portion. In one instance, when a pressure exerted on the back portion is greater than that on the front portion, the pressure on the back portion presses the valve head toward the closed position and impedes the movement of the valve head to the open position. It would be desirable to have a valve assembly capable of relieving a pressure difference between the front portion and the back portion of the valve head to reduce the force required to move the valve head to the open position.

SUMMARY OF THE INVENTION

Accordingly, the present invention provides a valve assembly. The valve assembly includes a housing having a first chamber, a second chamber, a valve seat disposed between the first chamber and the second chamber, and a valve head disposed in the housing and moveable relative to the housing between an open position spaced from the valve seat and a closed position engaged with the valve seat. The valve head defines a bore therethrough along an axis. The valve assembly also includes a valve stem operatively coupled to the valve head for moving the valve head between the open position and the closed position and a pressure relief mechanism including a plug coupled to the valve stem and extending along a plug axis in the bore of the valve head. The plug is moveable relative to the valve head from a sealed position preventing fluid communication through the bore to an unsealed position allowing fluid communication through the bore for relieving pressure differences between the first chamber and the second chamber when the valve head is in the closed position. One of the valve head and the plug define a groove elongated along the plug axis. The valve assembly further includes an intermediate member separate from the plug and the valve head and retained in the groove between the plug and the valve head. The groove is sized larger than the intermediate member along the plug axis for allowing selective movement of the plug relative to the valve head between the sealed position and the unsealed position.

One advantage of the present invention is that a new valve assembly is provided that includes a pressure relief mechanism for relieving pressure between pipes prior to opening of the valve assembly. Another advantage of the present invention is that the valve assembly includes the pressure relief mechanism that is capable of relieving a pressure difference between a front portion and a back portion of a valve head to reduce a force required to move the valve head to an open position. Yet another advantage of the present invention is that the valve assembly includes the pressure relieving mechanism that relieves the pressure difference such that the force required to move the valve head from the open position to the closed position is reduced. Still a further advantage of the present invention is that the valve assembly includes the pressure relieving mechanism having a plug and one of the valve head and the plug defining a groove elongated along a plug axis and an intermediate member separate from the plug and the valve head retained in the groove between the plug and the valve head. A further advantage of the present invention is that the valve assembly has the groove sized larger than the intermediate member along the plug axis for allowing selective movement of the plug relative to the valve head between a sealed position and an unsealed position.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
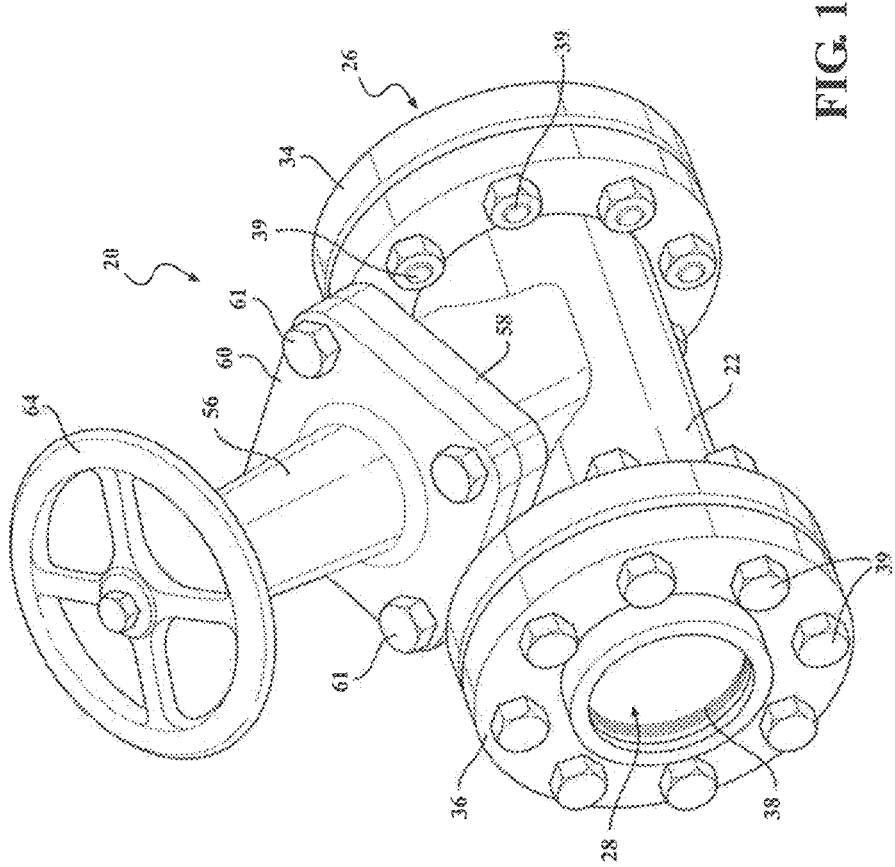
FIG. 1 is a perspective view of one embodiment of a valve assembly, according to the present invention.

Referring to the drawings and in particular FIG. 1, one embodiment of a valve assembly 20, according to the present invention, is shown. The valve assembly 20 is of a type referred to in industry as a globe valve. The valve assembly 20 is typically coupled to pipes (not shown) of a fluid pipe system (not shown) for providing fluid communication between the pipes. The valve assemblies 20 shown in FIGS. 1-6C provide a straight connection between the pipes of the fluid pipe system. Alternatively, the valve assembly 20 can be configured to change the direction of flow, e.g., by 90°. It should be appreciated that, when referring to the figures, like numerals indicate like or corresponding parts throughout the several views of the valve assembly 20.

The fluid pipe system can, for example, handle fluids such as propane, compressed nitrogen, anhydrous ammonia, petrochemicals, or other types of chemicals. The valve assembly 20 can be used in, for example, bobtail transport and bulk plant applications. The pipes to which the valve assembly 20 is coupled can be, for example, 1¼" or larger diameter.

Referring to FIGS. 1-3B of a first embodiment of the valve assembly 20, the valve assembly 20 includes a housing 22. The housing 22 defines a chamber 24 having an inlet 26 and an outlet 28. The chamber 24 is divided into a first chamber 30 and a second chamber 32 with the first chamber 30 defining the inlet 26 and the second chamber 32 defining the outlet 28.

The inlet 26 and the outlet 28 are both generally circular in cross-section and are spaced from each other along a pipe axis P. The housing 22 is coupled to the pipes at the inlet 26 and the outlet 28. The housing 22 includes a flange 34 at the inlet 26 and a flange 36 at the outlet 28 for engaging the pipes. The flanges 34, 36, for example, present a threaded interior surface 38 for threadedly engaging the pipes. Alternatively, the flanges 34, 36 can engage the pipes in any fashion without departing from the nature of the present invention. The flanges 34, 36 are removably attached to the housing 22. For example, threaded fasteners 39, e.g., bolts and nuts, engage the flanges 34, 36 and the housing 22 to fasten the flanges 34, 36 to the housing 22.

Figure 2A:
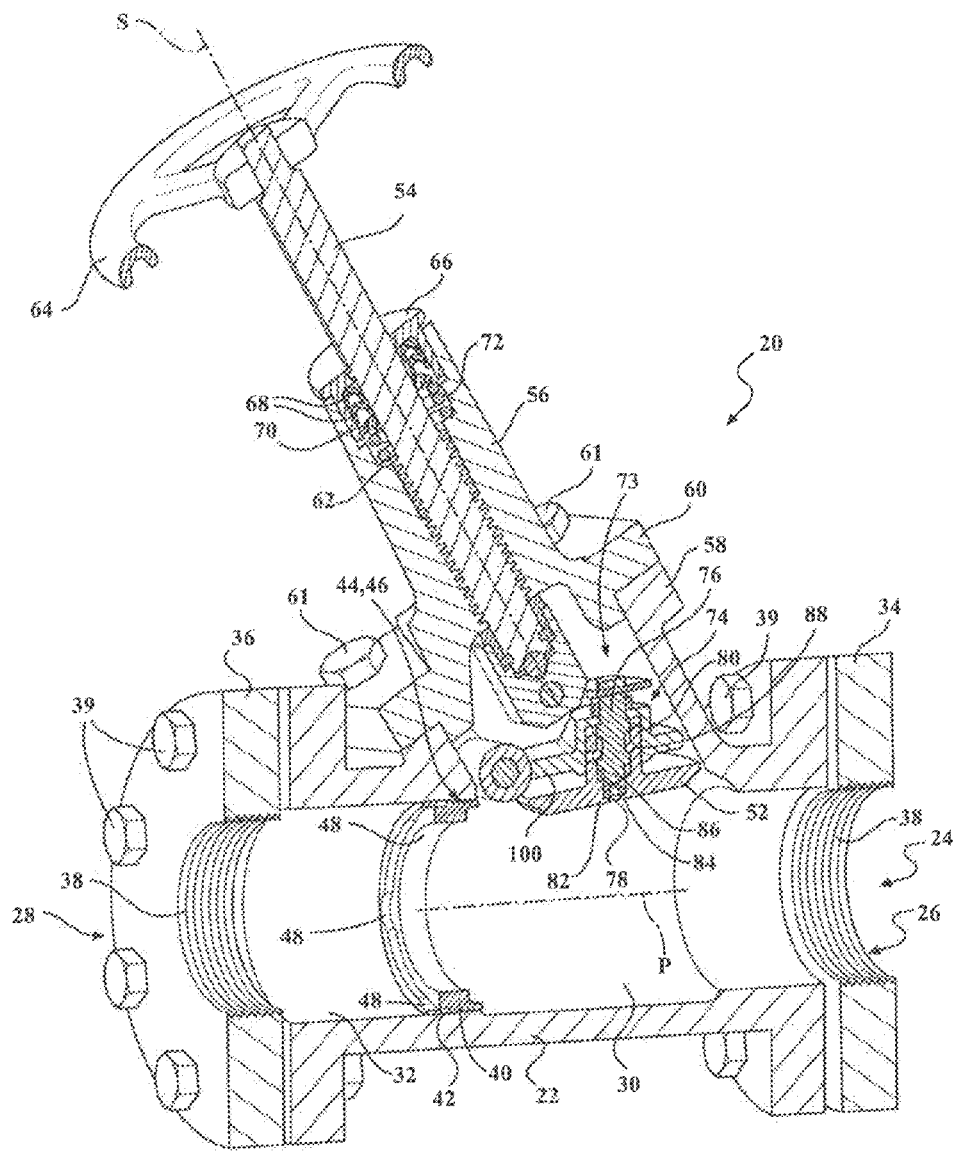
FIG. 2A is a sectional view of a first embodiment of the valve assembly of FIG. 1 illustrated with a valve head in an open position.
Figure 2B:
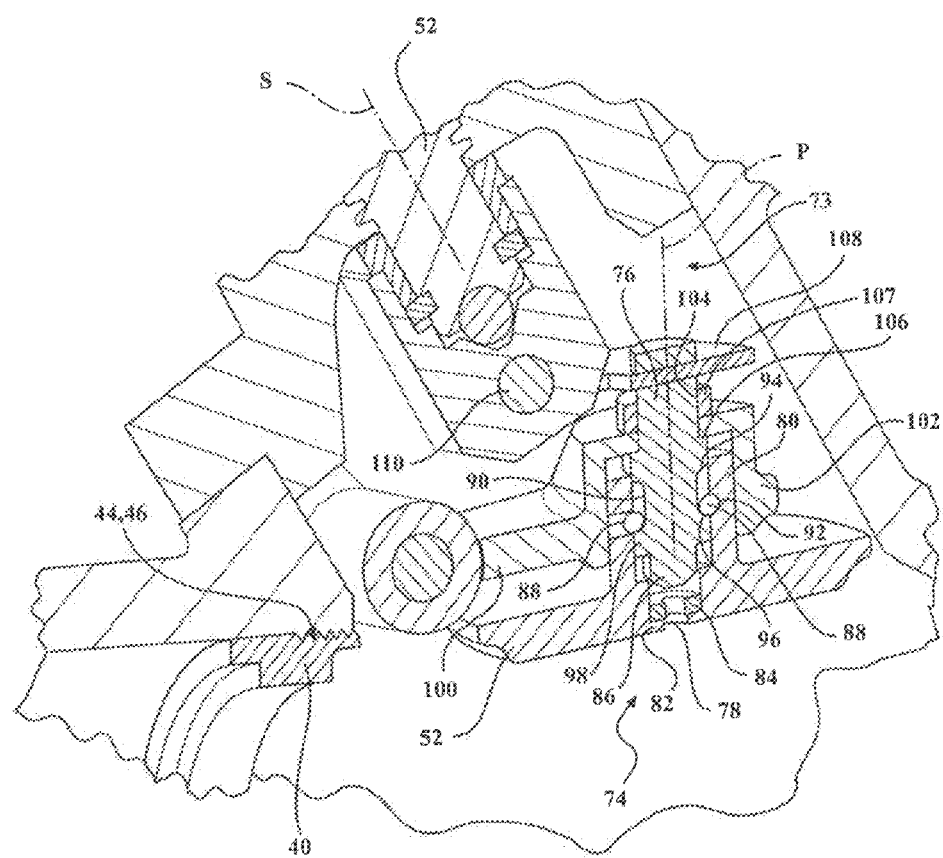
FIG. 2B is an enlarged view of a portion of the valve assembly of FIG. 2A.
Figure 3A:
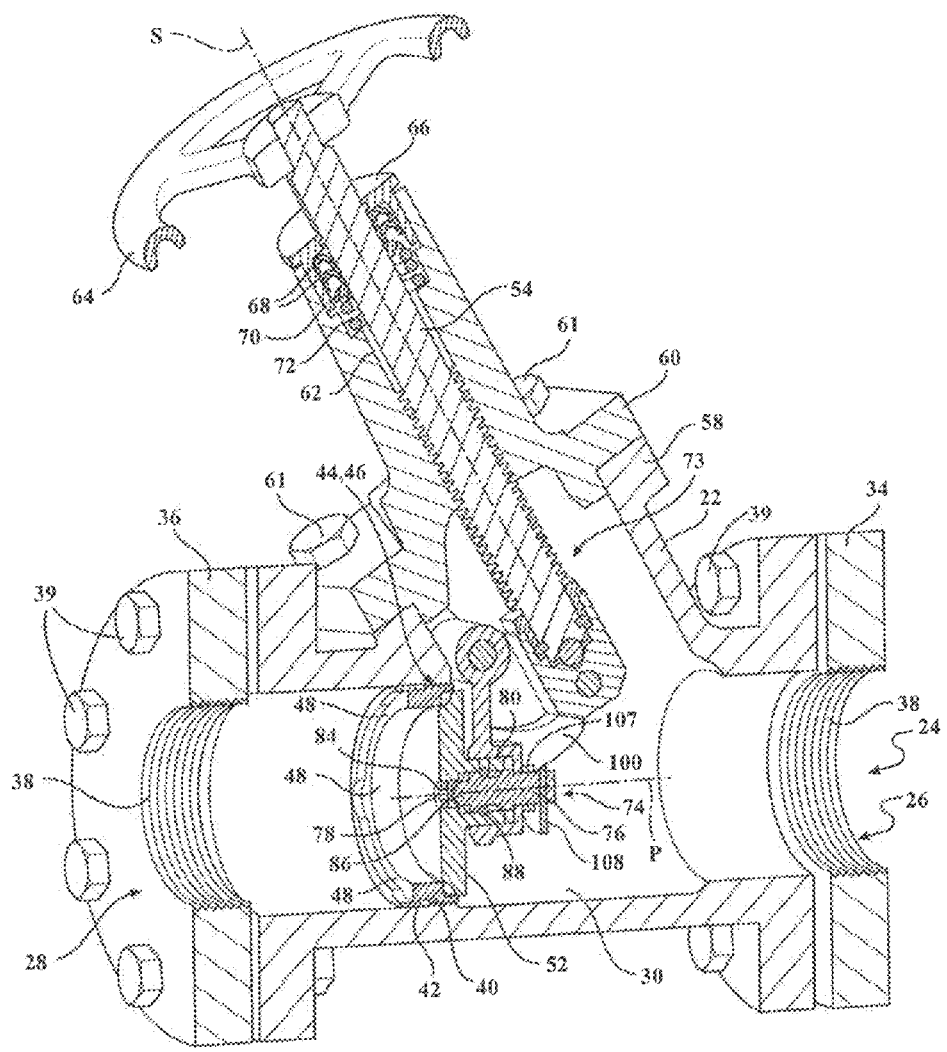
FIG. 3A is a sectional view of the first embodiment of the valve assembly of FIG. 1 illustrated with the valve head in a closed position.
Figure 3B:
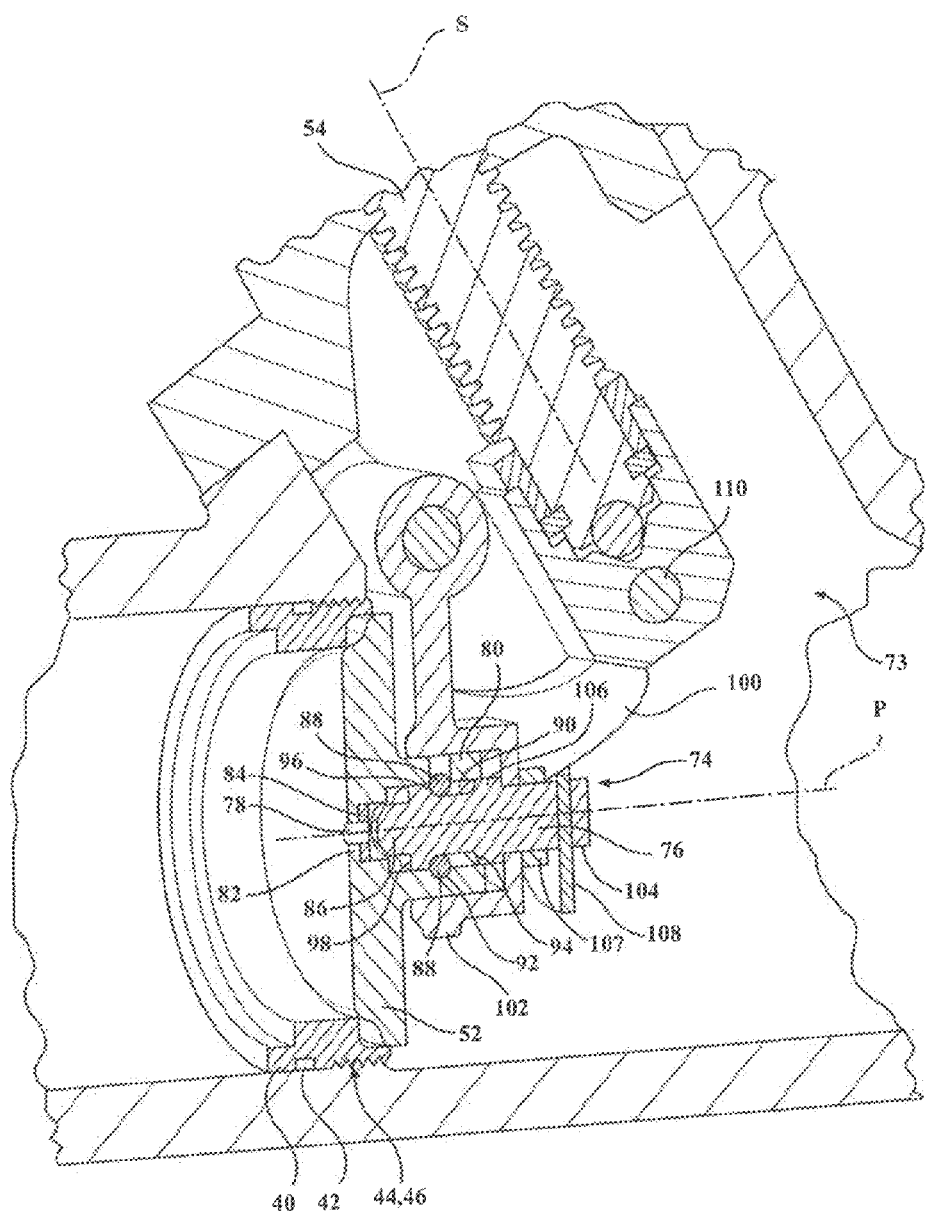
FIG. 3B is an enlarged view of a portion of the valve assembly of FIG. 3A.

Referring to FIGS. 2A and 3A, the valve assembly 20 includes a valve seat 40 disposed between the first chamber 30 and the second chamber 32 and a seal 42, e.g., a rubber o-ring, extending circumferentially about the valve seat 40 and engaging the housing 22 to seal between the valve seat 40 and the housing 22. The valve seat 40 and the housing 22 are typically formed of metal.

The valve seat 40 is removably engaged with the housing 22. For example, the valve seat 40 is typically threadedly engaged with the housing 22. As illustrated in FIGS. 2A and 3A, the housing 22 defines threads 44 inside the chamber 24 and the valve seat 40 includes corresponding threads 46 that engage the threads 44 of the housing 22. At least one of the flanges 34, 36 is typically disengaged from the housing 22 to access the valve seat 40. For example, as illustrated in FIGS. 2A and 3A, the flange 36 is removed from the outlet 28 of the housing 22 to access the valve seat 40.

The valve seat 40 may include engagement features 48 for aiding in disengagement of the valve seat 40 from the housing 22. The engagement features 48 are typically configured to engage a tool (not shown). With reference to FIGS. 2A and 3A, the engagement features 48 of the valve seat 40, for example, are castellated for engaging a corresponding tool having a castellated configuration to rotate the valve seat 40 relative to the housing 22 to threadedly disengage the valve seat 40 from the housing 22. In the alternative to the removable valve seat 40 illustrated in FIGS. 2A and 3A, the housing 22 can define a fixed valve seat 50, e.g., a reduced cross-section of the chamber 24, as illustrated in FIGS. 4A and 5A.

The valve assembly 20 also includes a valve head 52 disposed in the housing 22 and a valve stem 54 coupled to the valve head 52. The valve head 52 is moveable relative to the housing 22 between an open position, as illustrated in FIGS. 2A and 4A, and a closed position, as illustrated in FIGS. 3A and 5A. The valve stem 54 extends along a stem axis S. The valve stem 54 is moveably coupled to the housing 22 for moving the valve head 52 between the open position and the closed position, as set forth further below. When the valve head 52 is in the open position, the valve head 52 is spaced from the valve seat 40 such that the first chamber 30 and the second chamber 32 are in fluid communication with each other. When the valve head 52 is in the closed position, the valve head 52 is engaged with the valve seat 40 to prevent fluid communication between the first chamber 30 and the second chamber 32. The valve stem 54 and the valve head 52 are typically formed of metal such as stainless steel.

Referring to FIGS. 1-6C, the valve assembly 20 further includes a bonnet 56 attached to the housing 22. The housing 22 includes a flange 58 and the bonnet 56 includes a corresponding flange 60. The valve assembly 20 includes fasteners 61, e.g., bolts, to couple the flange 58 of the bonnet 56 to the flange 60 of the housing 22. Alternatively, the bonnet 56 can be attached to the housing 22 in any fashion without departing from the nature of the present invention. The valve assembly 20 also includes a bonnet gasket (not shown) typically disposed between the flange 60 of the housing 22 and the flange 58 of the bonnet 56 to seal between the housing 22 and the bonnet 56. The housing 22 and the bonnet 56 are typically formed of metal such as ductile iron with a powder coat finish.

Figure 4A:
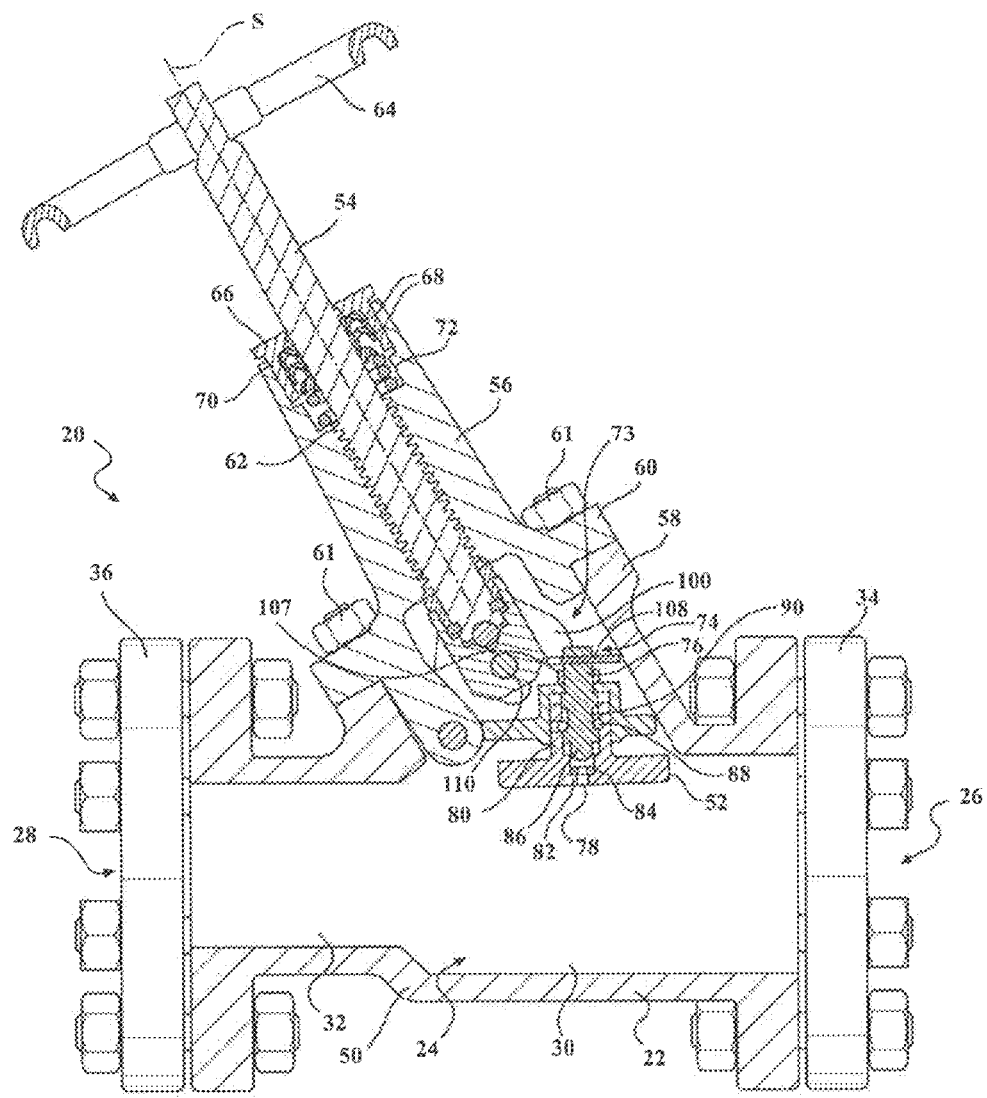
FIG. 4A is a sectional view of a second embodiment of the valve assembly of FIG. 1 illustrated with the valve head in the open position.
Figure 5A:
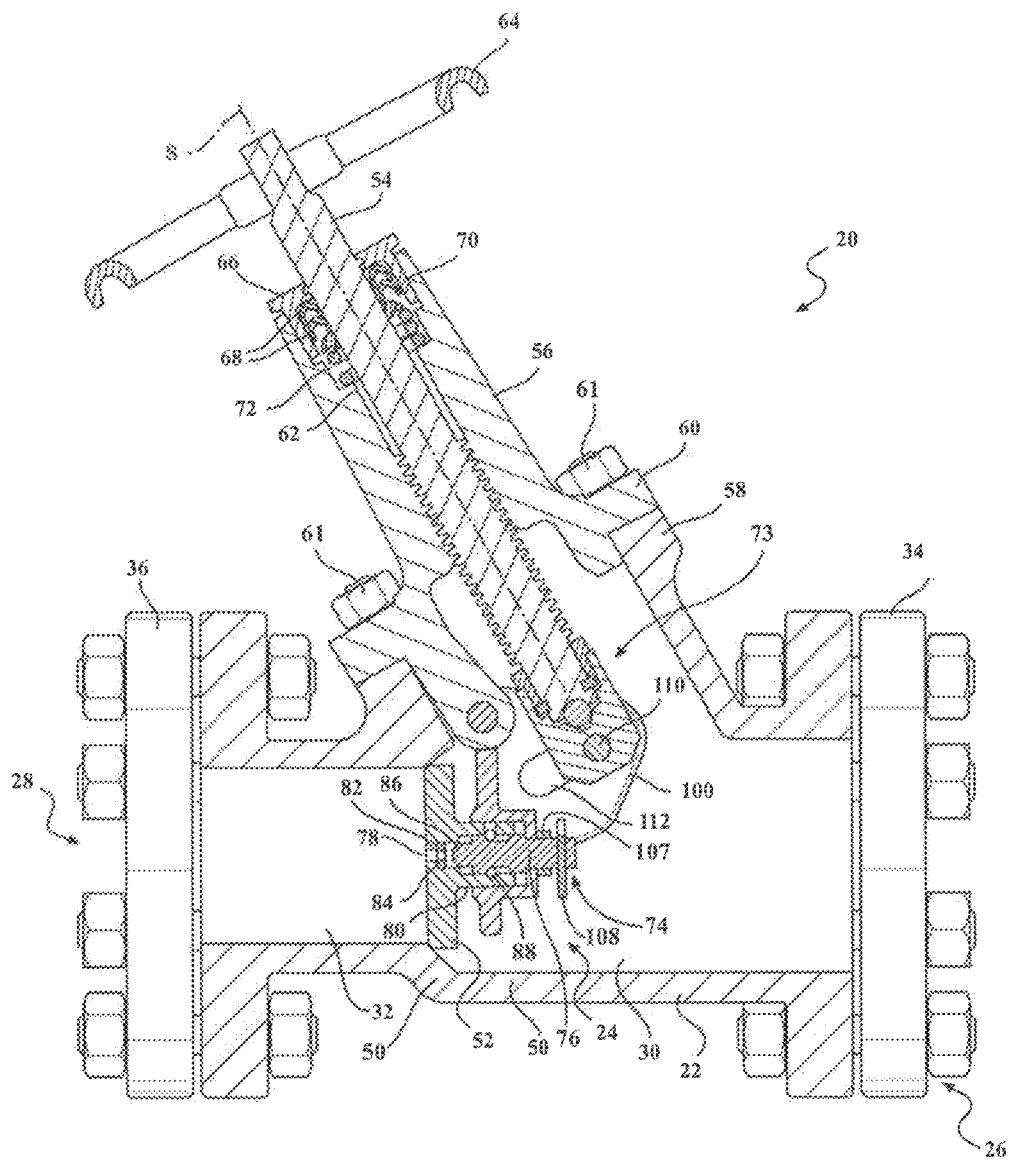
FIG. 5A is a sectional view of the second embodiment of the valve assembly of FIG. 1 illustrated with the valve head in the closed position.
Figure 5B:
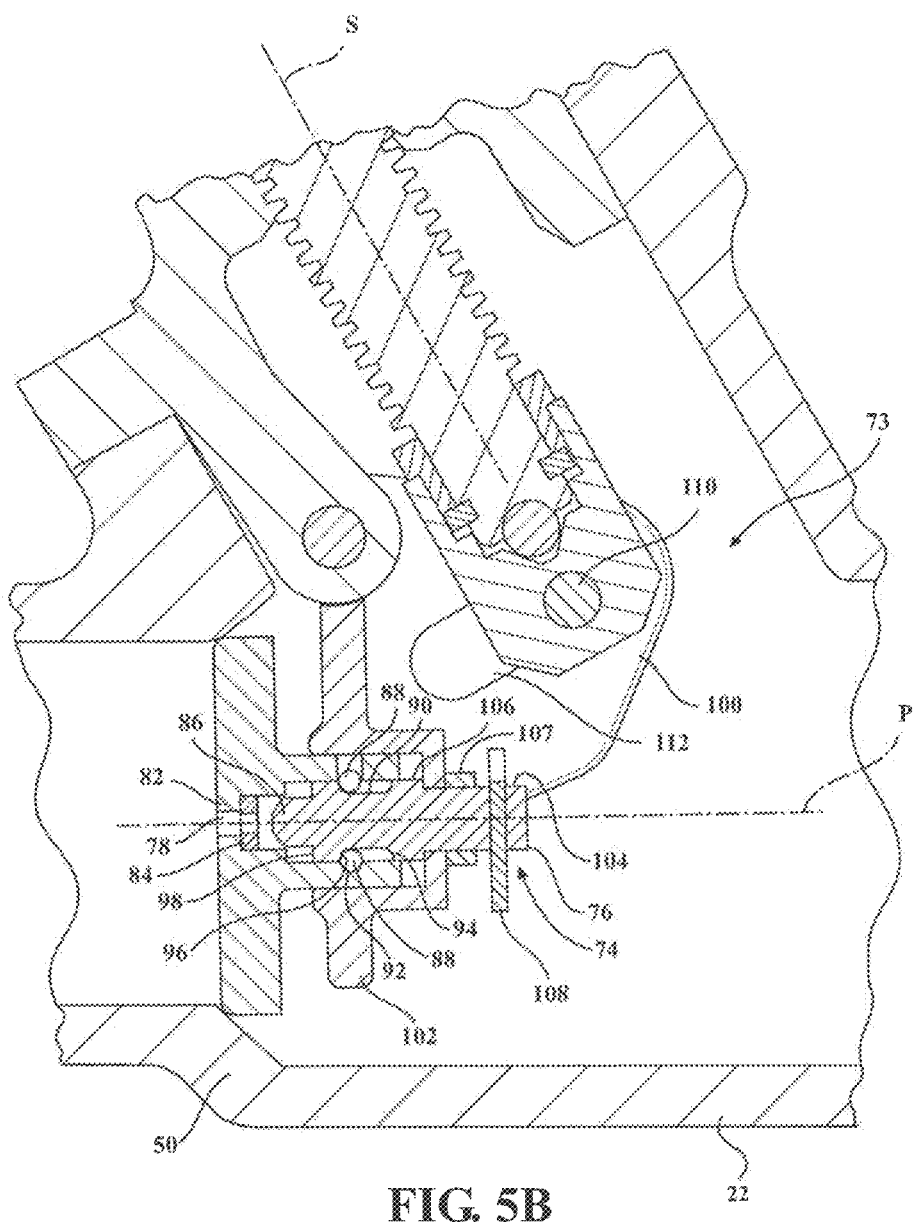
FIG. 5B is an enlarged view of a portion of the valve assembly of FIG. 5A.
Figure 5C:
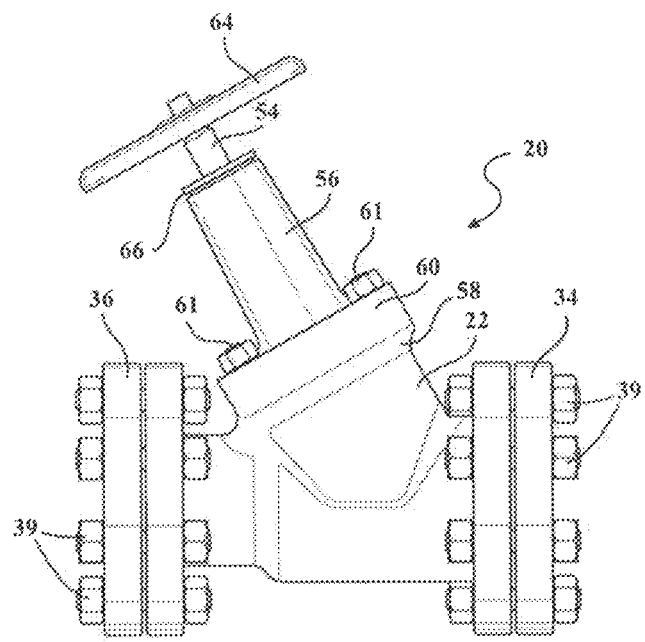
FIG. 5C is a side view of the valve assembly of FIG. 5A.
Figure 5D:
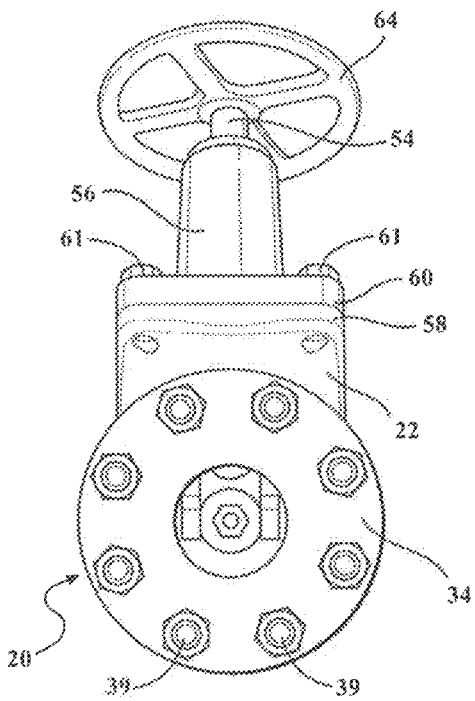
FIG. 5D is an end view of the valve assembly of FIG. 5A.
Figure 6A:
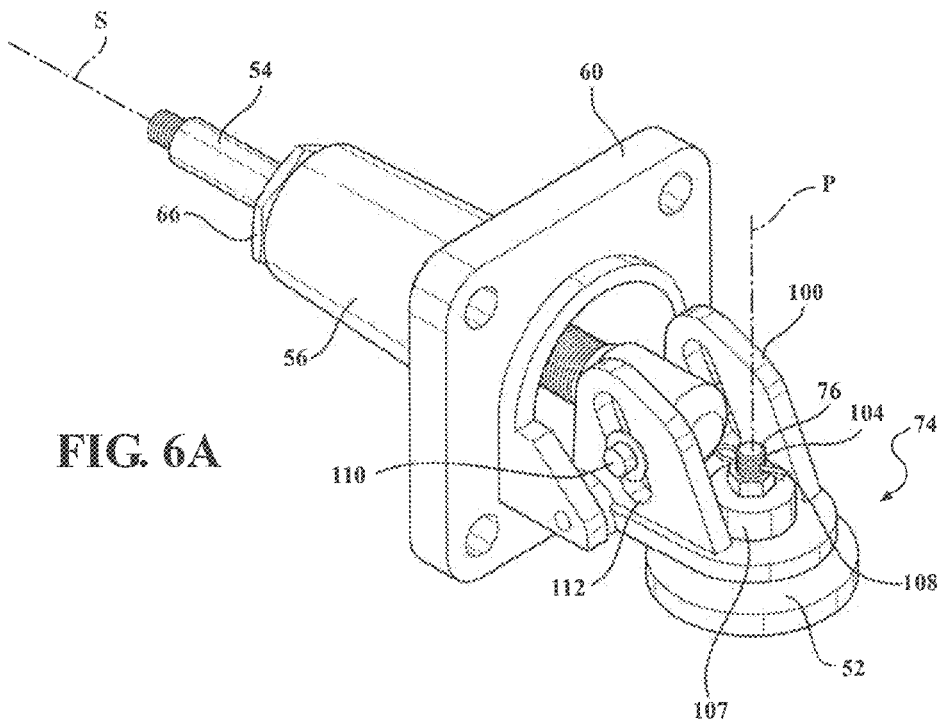
FIG. 6A is a perspective view of a portion of the second embodiment of the valve assembly of FIG. 5 A illustrating a bonnet, a valve stem, a valve head, and a link.
Figure 6B:
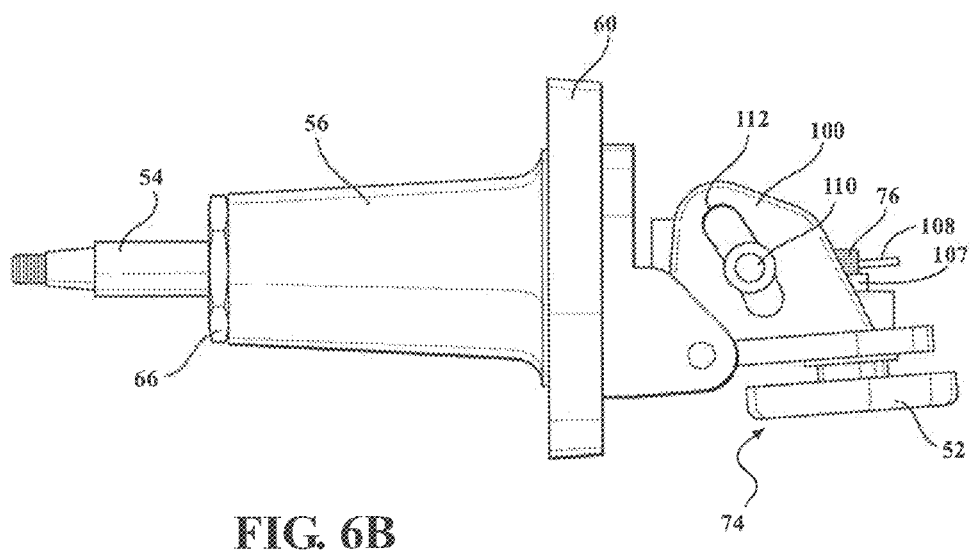
FIG. 6B is a side view of the portion of FIG. 6A.
Figure 6C:
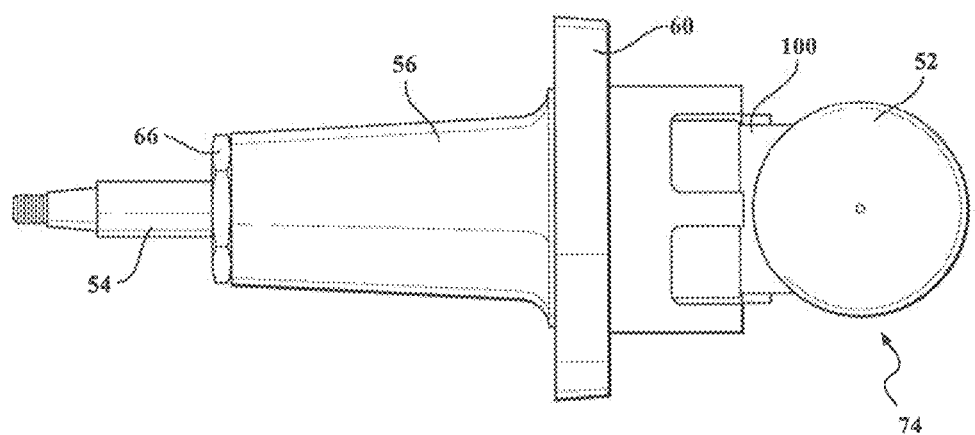
FIG. 6C is a bottom view of the portion of FIG. 6A.

Referring to FIGS. 2A and 4A, the valve stem 54 is threadedly coupled to the bonnet 56 of the housing 22 such that rotation of the valve stem 54 relative to the housing 22 moves the valve stem 54 relative to the housing 22 along the stem axis S. Specifically, the bonnet 56 defines a throughbore 62. The valve stem 54 is disposed in the throughbore 62 and is moveably coupled to the throughbore 62. More specifically, the throughbore 62 and the valve stem 54 are threadedly engaged.

The valve assembly 20 includes a hand wheel 64 coupled to the valve stem 54 to rotate the valve stem 54 and move the valve head 52 between the open position and the closed position. More specifically, the hand wheel 64 is typically rotated clockwise to move the valve head 52 to the closed position and the hand wheel 64 is rotated counterclockwise to move the valve head 52 to the open position.

The valve assembly 20 also includes a bushing 66 retained to the bonnet 56 by, for example, threaded engagement or press fit engagement. The valve stem 54 extends through the bushing 66 and the bushing 66 seals against the valve stem 54 to prevent fluid flow therebetween.

Referring to FIGS. 2A and 4A, the valve assembly 20 typically, for example, includes one or more bushing seals 68 to seal between the valve stem 54 and the bushing 66 to prevent the escape of fluid therebetween. The bushing seals 68 are generally annular inverted u-shaped cups. It should be appreciated that, however, the bushing seals 68 may have any other suitable configuration without departing from the nature of the present invention.

The valve assembly 20 also includes a seal expander 70 disposed between the bushing 66 and the valve stem 54 and an expander spring 72 disposed in the throughbore 62 and biasing the seal expander 70 toward the upper end of the bonnet 56 and biasing the bushing seals 68 toward the upper end of the bonnet 56. An end of the seal expander 70 is generally tapered to press against the bushing seals 68 due to the bias of the expander spring 72 such that the seal expander 70 spreads the bushing seals 68 into simultaneous contact with the bushing 66 and the valve stem 54. It should be appreciated that the bushing seals 68 are stacked so that each bushing seal 68 forces the adjacent bushing seal 68 to spread and contact the bushing 66 and the valve stem 54.

The bonnet 56 and/or the housing 22 define a rear pocket 73. For example, as illustrated in FIGS. 2A and 4A, the bonnet 56 and the housing 22 define the rear pocket 73. When moved to the open position, the valve head 52 is disposed within the rear pocket 73 and is recessed away from the flow path of fluid through the housing 22 to reduce flow restrictions. It should be appreciated that the disposition of the valve head 52 in the rear pocket 73 in the open position aids in reducing flow restriction through the valve assembly 20.

Referring to FIGS. 2A-6C, the valve assembly 20 includes a pressure relief mechanism, generally indicated at 74, for relieving pressure differences between the first chamber 30 and the second chamber 32 when the valve head 52 is in the closed position and when the valve stem 54 is rotated to move the valve head 52 from the closed position to the open position. The pressure relief mechanism 74 is coupled to the valve stem 54 and the valve head 52.

The pressure relief mechanism 74 includes a plug 76 coupled to the valve stem 54 and extending along a plug axis P. The valve head 52 defines a bore 78. The valve head 52 typically includes a tube 80 that defines the bore 78.

With the valve head 52 in the closed position, the plug 76 is moveable in the bore 78 relative to the valve head 52 between a sealed position and an unsealed position. In the sealed position, as illustrated in FIGS. 3A and 5A, the plug 76 seals against the valve head 52 to prevent fluid communication through the bore 78 between the first chamber 30 and the second chamber 32. In the unsealed position, the plug 76 is spaced from the valve head 52 to allow fluid communication through the bore 78 between the first chamber 30 and the second chamber 32. Although FIGS. 2A and 4A illustrate the valve head 52 in the open position, it should be appreciated that the plug 76 is in the unsealed position and, if the valve head 52 were in the closed position, fluid would be able to flow through the bore 78 between the first chamber 30 and the second chamber 32.

Referring to FIGS. 2A-5C, the valve head 52 defines a ledge 82 in the bore 78 and a bore seal 84 abuts the ledge 82. The plug 76 has an end 86 that contacts the bore seal 84 and seals against the bore seal 84 when the valve stem 54 is in the sealed position and is spaced from the bore seal 84 when the valve stem 54 is in the unsealed position. The bore seal 84 is formed of a suitable sealing material such as, for example, nitrile, Teflon®, Viton®, or the like. The end 86 of the plug 76 has a chamfered configuration for cooperating with the bore seal 84.

The pressure relief mechanism 74 includes one or more intermediate members 88, for example ball bearings, disposed in the bore 78 between the plug 76 and the valve head 52. The intermediate members 88 guide the relative movement of the plug 76 and the valve head 52 and retain the plug 76 in the bore 78 of the valve head 52. The intermediate members 88 are separate from and coupled to the valve head 52 and the plug 76, i.e., the intermediate members 88 are formed separately from the valve head 52 and the plug 76 and are introduced between the valve head 52 and the plug 76 as separate units.

Figure 4B:
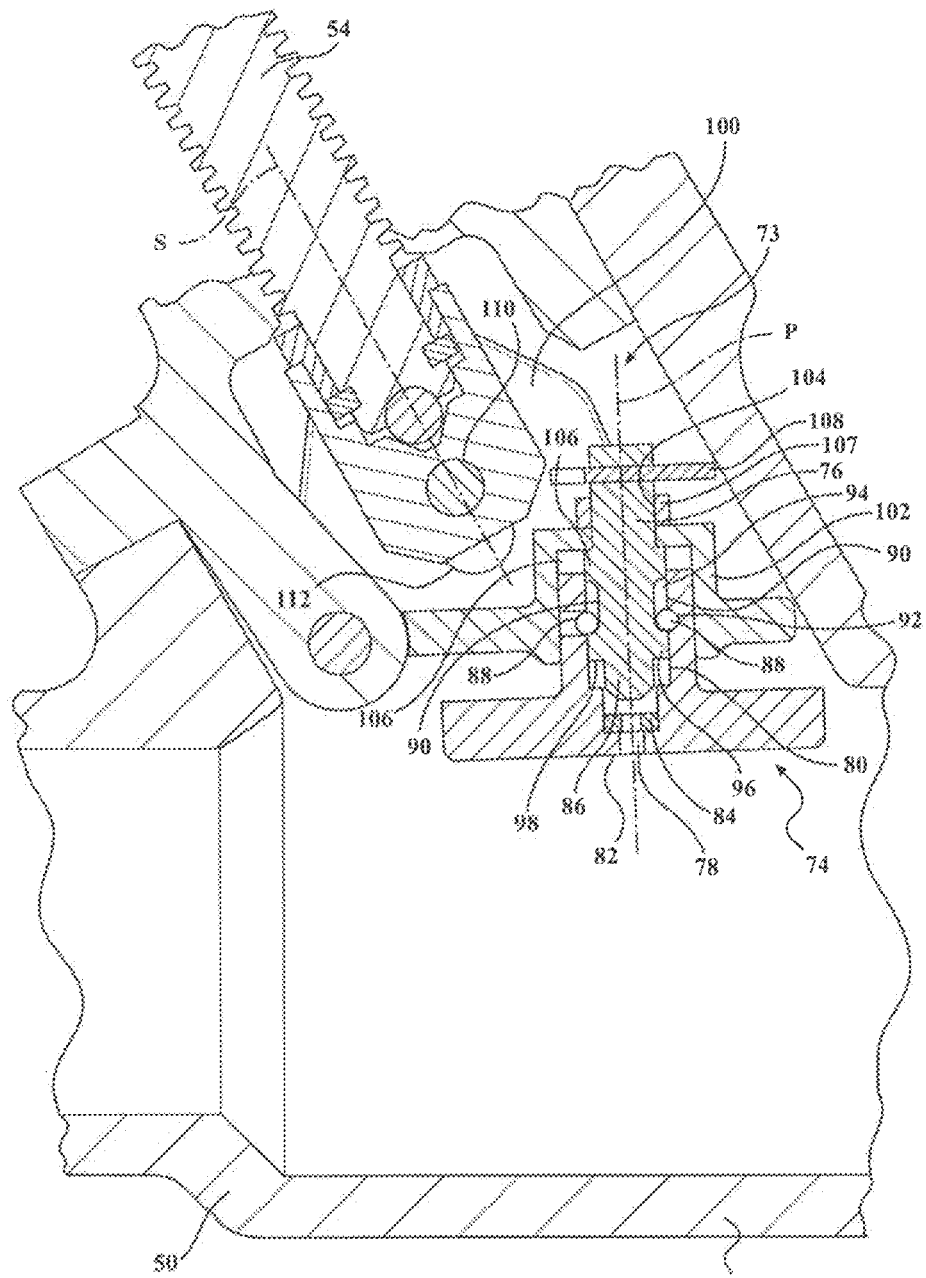
FIG. 4B is an enlarged view of a portion of the valve assembly of FIG. 4A.
Figure 4C:
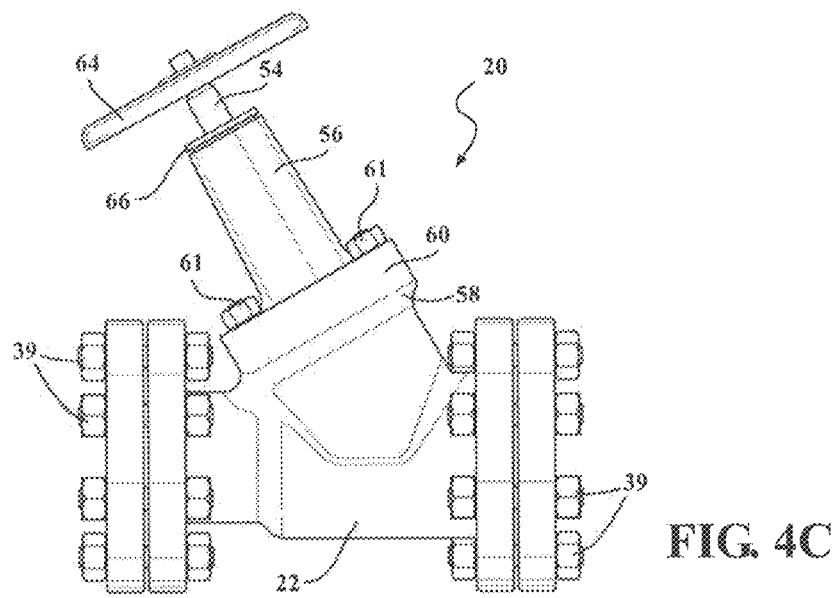
FIG. 4C is a side view of the valve assembly of FIG. 4A.
Figure 4D:
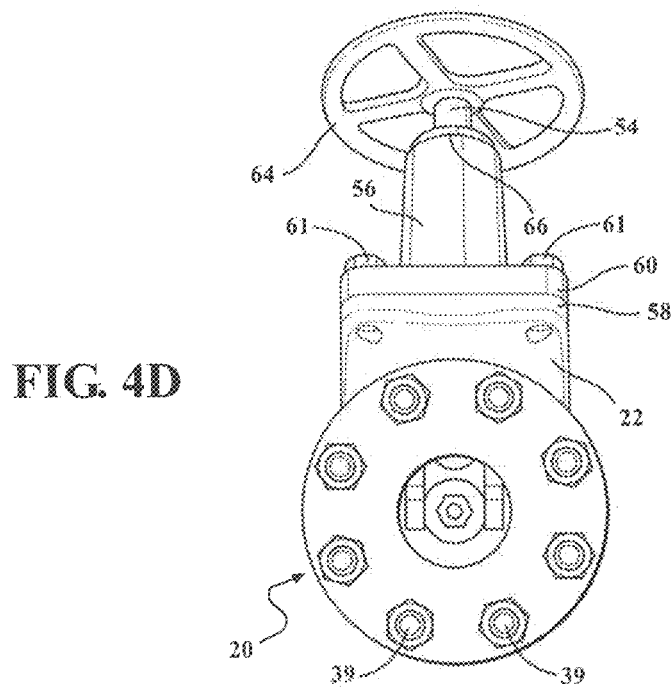
FIG. 4D is an end view of the valve assembly of FIG. 4A.
Figure 4E:
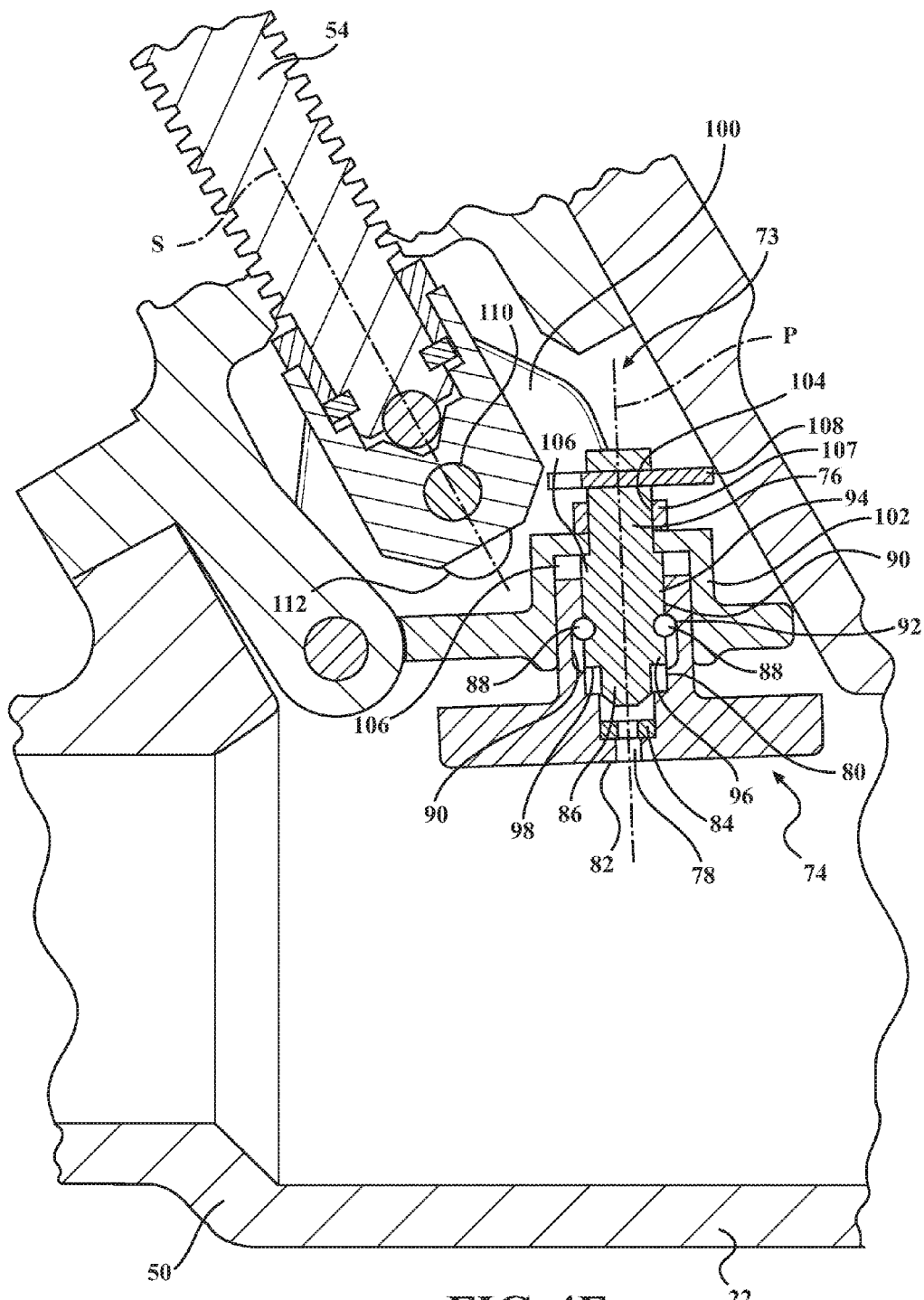
FIG. 4E is an enlarged view of another embodiment of a portion of the valve assembly of FIG. 4A.

One of the plug 76 and the valve head 52 defines a groove 90 elongated along the pin axis P and receives the intermediate members 88 to allow for relative movement of the plug 76 and the valve head 52 along the pin axis P between the sealed position and the unsealed position as illustrated in FIGS. 4B and 4E. In other words, the intermediate members 88 move relative to the groove 90 along the pin axis P when the valve stem 54 is moved along the stem axis S between the sealed position and the unsealed position. The intermediate members 88 are retained in the groove 90 between the plug 76 and the valve head 52. The groove 90 is typically continuous about the pin axis P.

As set forth above, one of the plug 76 and the valve defines the groove 90, and the intermediate members 88 are typically fixed along the pin axis P relative to other of the plug 76 and the valve head 52. In the embodiment illustrated, the intermediate members 88 are fixed along the pin axis P relative to the valve head 52 and the plug 76 defines the groove 90. The valve head 52 defines a recess 92, e.g., a race, with the intermediate members 88 fixed along the pin axis P in the recess 92.

Typically, the diameter of the intermediate members 88 generally approximates the size of the recess 92 such that the intermediate members 88 are fixed along the pin axis P relative to the recess 92. Alternatively, the recess 92 can be larger than the diameter of the intermediate members 88.

The groove 90 is sized larger than the intermediate members 88 along the pin axis P for allowing selective movement of the valve stem 54 between the sealed position and the unsealed position. Specifically, the groove 90 is defined between a first wall 94 and a second wall 96. The first wall 94 and second wall 96 are spaced from each other along the pin axis P and oppose each other along the pin axis P.

The first wall 94 engages the intermediate members 88 when the end 86 of the plug 76 contacts the bore seal 84 for preventing excessive compression of the bore seal 84 by the end 86. The plug 76 and the valve head 52 also include opposing shoulders 98 for preventing excessive compression of the bore seal 84 by the end 86.

The second wall 96 engages the intermediate members 88 when the valve stem 54 moves toward the unsealed position for moving the valve head 52 to the open position. The intermediate members 88 are spaced from the second wall 96 when the valve stem 54 is in the sealed position and are spaced from the first wall 94 when the valve stem 54 is in the unsealed position. Typically, the first wall 94 and the second wall 96 correspond in shape to the intermediate members 88.

The intermediate members 88 move relative to the valve stem 54 and/or the valve head 52 such that the valve head 52 can typically swivel 360° about the valve stem 54. When the valve head 52 contacts the valve seat 40 as the valve stem 54 is rotated toward the closed position, the valve head 52 stops rotating and the valve stem 54 is further tightened toward the closed position to ensure proper sealing between the valve head 52 and the valve seat 40. It should be appreciated that this configuration eliminates scouring of the valve seat 40 by the valve head 52 when the valve head 52 is moved to the closed position, thereby increasing the reliability and durability of the valve assembly 20.

The intermediate members 88 are generally spherical in shape. However, it is to be appreciated that the intermediate members 88 can be any shape such that the intermediate members 88 retain the valve head 52 and the valve stem 54 together. The intermediate members 88 are typically formed of metal. However, it should be appreciated that the intermediate members 88 can be formed of any type of rigid material that maintains shape during swiveling of the valve head 52 relative to the valve stem 54.

The valve assembly 20 also includes a link 100 coupled to the valve stem 54 and the plug 76 to transmit movement from the valve stem 54 to the plug 76. The link 100 is pivotably connected to the housing 22. A first embodiment of the link 100 is illustrated in FIGS. 2A-3B and a second embodiment of the link 100 is illustrated in FIGS. 4A, 5A, and 6A-C.

The link 100 defines a cup 102 and the plug 76 is disposed in the cup 102. The link 100 receives the tube 80 of the valve head 52 between the cup 102 and the plug 76. The plug 76 includes a threaded surface 104 extending from a shoulder 106 for receiving a nut 107 for attaching the plug 76 to the cup 102 and a cotter pin 108 secures the nut 107 on the plug 76. Alternatively, the plug 76 can be attached to the cup 102 in any fashion without departing from the nature of the present invention.

Referring to FIGS. 2A and 3A, the first embodiment of the link 100 is pivotably coupled to the valve stem 54. The valve assembly 20 includes a pin 110, for example, to engage the link 100 and the valve stem 54. When the valve stem 54 is rotated, the link 100 pivots relative to the valve stem 54 and relative to the housing 22.

Referring to FIGS. 4A-6C, the second embodiment of the link 100 defines a cam slot 112. The pin 110 engages the valve stem 54 and engages the cam slot 112. When the valve stem 54 is rotated, the pin 110 rides along the cam slot 112 to pivot the link 100 relative to the housing 22.

The valve assembly 20 operates as follows. Rotation of the valve stem 54 relative to the housing 22 moves the valve stem 54 between the sealed position and the unsealed position and moves the valve head 52 between the open position and the closed position. When the valve head 52 is in the closed position, the first wall 94 engages the intermediate members 88 such that the valve stem 54 is in the sealed position with the bore seal 84 disposed between and sealing to the end 86 of the plug 76 and the ledge 82 of valve head 52, as illustrated in FIGS. 3A and 5A.

To move the valve head 52 to the open position, the hand wheel 64 is rotated, e.g., counter-clockwise, thereby traversing the valve stem 54 through the bonnet 56. This movement of the valve stem 54 pivots the link 100 about the housing 22 and moves the plug 76 from the sealed position to the unsealed position, i.e., the end 86 of the plug 76 separates from the bore seal 84, before the second wall 96 engages the intermediate members 88. As such, the end 86 of the plug 76 separates from the bore seal 84 before the valve head 52 is moved away from the valve seat 40. In one embodiment, fluid may flow past the end 86 of the plug 76 and out an aperture (not shown) in the tube 80. In another embodiment, fluid may flow past the plug 76 due to a difference in diameter between the plug 76 and the bore 78 and out an aperture extending through the tube 80 adjacent the intermediate member 88. As a result, a pressure difference that may exist between the second chamber 32 and the first chamber 30 equalizes as the plug 76 separates from the bore seal 84 before the valve head 52 is moved away from the valve seat 40. It should be appreciated that when the end 86 of the plug 76 separates from the bore seal 84, a small amount of fluid is allowed to flow through the bore 78 and out of the valve head 52 to equalize the pressure difference between the second chamber 32 and the first chamber 30.

Typically the bore seal 84 is uncompressed in less than one full rotation of the hand wheel 64. One benefit of reducing or eliminating the pressure differential between the second chamber 32 and the first chamber 30 is that a force required to rotate the hand wheel 64 is reduced since the pressures in the second chamber 32 and first chamber 30 approach one another or equalize. This is particularly beneficial when the pressure of the second chamber 32 is substantially greater than the pressure of the first chamber 30.

As the valve stem 54 is further rotated counter-clockwise, the valve stem 54 continues to move along the stem axis S relative to the valve head 52 until the intermediate members 88 engage the second wall 96. Once the intermediate members 88 engage the second wall 96, further counter-clockwise rotation of the valve stem 54 results in movement of the valve head 52 from the closed position toward the open position, i.e., the valve head 52 separates from the valve seat 40. The valve stem 54 is rotated counter-clockwise further to move the valve head 52 to the open position recessed in the rear pocket 73 of the bonnet 56, as illustrated in FIGS. 2A and 4A.

To move the valve head 52 back to the closed position, the hand wheel 64 is rotated clockwise thereby traversing the valve stem 54 and the valve head 52 toward the valve seat 40. As the valve head 52 contacts the valve seat 40, the valve head 52 ceases to rotate and the hand wheel 64 is rotated clockwise further to tightly seal the valve head 52 against the valve seat 40 in the closed position. In the closed position, the intermediate members 88 engage the first wall 94. As set forth above, the distance between the end 86 of the plug 76 and the first wall 94 is sized such that the end 86 of the plug 76 properly seals against the bore seal 84 without damaging the bore seal 84 by over-compression.

Embodiments of the present invention have been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A valve assembly comprising:
   a housing having a first chamber, a second chamber, and a valve seat disposed between said first chamber and said second chamber;
   a valve head disposed in said housing and moveable relative to said housing between an open position spaced from said valve seat and a closed position engaged with said valve seat, said valve head defining a bore therethrough along an axis;
   a valve stem operatively coupled to said valve head and being rotatably and reciprocally movable along a stem axis for moving said valve head between said open position and said closed position;
   a pressure relief mechanism including a plug coupled to said valve stem and extending along a plug axis in said bore of said valve head, said plug being moveable relative to said valve head from a sealed position preventing fluid communication through said bore to an unsealed position allowing fluid communication through said bore for relieving pressure differences between said first chamber and said second chamber when said valve head is in said closed position;

a link disposed within and pivotably connected to said housing and coupled to said valve stem and said plug to transmit movement from said valve stem to said plug;

one of said valve head and said plug defining a groove elongated along said plug axis; and an intermediate member separate from said plug and said valve head and retained in said groove between said plug and said valve head wherein said groove is sized larger than said intermediate member along said plug axis for allowing selective movement of said plug relative to said valve head between said sealed position and said unsealed position.

2. A valve assembly as set forth in claim 1 wherein one of said valve head and said plug includes a first wall and the other of said valve head and said plug includes a second wall defining said groove, said first wall and said second wall are spaced radially from each other and oppose each other radially.

3. A valve assembly as set forth in claim 2 wherein said intermediate member is spaced from said second wall when said valve stem is in said sealed position and is spaced from said first wall when said valve stem is in said unsealed position.

4. A valve assembly as set forth in claim 1 wherein said valve head defines a ledge in said bore.

5. A valve assembly as set forth in claim 4 including a bore seal disposed in said bore and abutting said ledge for contact with said plug when said valve stem is in said sealed position.

6. A valve assembly as set forth in claim 5 wherein a first wall engages said intermediate member when said plug contacts said bore seal.

7. A valve assembly as set forth in claim 5 wherein said plug and said valve head include opposing shoulders.

8. A valve assembly as set forth in claim 1 wherein said valve head defines a recess with said intermediate member fixed along said plug axis in said recess.

9. A valve assembly as set forth in claim 1 wherein said valve head includes a tube that defines said bore.

10. A valve assembly comprising:
a housing having a first chamber, a second chamber, and a valve seat disposed between said first chamber and said second chamber;
a valve head disposed in said housing and moveable relative to said housing between an open position spaced from said valve seat and a closed position engaged with said valve seat, said valve head defining a bore therethrough along an axis;
a valve stem operatively coupled to said valve head for moving said valve head between said open position and said closed position;
a pressure relief mechanism including a plug coupled to said valve stem and extending along a plug axis in said bore of said valve head, said plug being moveable relative to said valve head from a sealed position preventing fluid communication through said bore to an unsealed position allowing fluid communication through said bore for relieving pressure differences between said first chamber and said second chamber when said valve head is in said closed position;
one of said valve head and said plug defining a groove elongated along said plug axis;

an intermediate member separate from said plug and said valve head and retained in said groove between said plug and said valve head wherein said groove is sized larger than said intermediate member along said plug axis for allowing selective movement of said plug relative to said valve head between said sealed position and said unsealed position;
a link pivotably connected to said housing and coupled to said valve stem and said plug to transmit movement from said valve stem to said plug;
wherein said valve head includes a tube that defines said bore; and
wherein said link defines a cup to receive said plug and said link receives said tube of said valve head between said cup and said plug.

11. A valve assembly as set forth in claim 10 wherein said plug includes a threaded surface and a fastener threadably engages said threaded surface for attaching said plug to said cup.

12. A valve assembly as set forth in claim 10 including a pin engaging said link and said valve stem to pivotably connect said link to said valve stem.

13. A valve assembly comprising:
a housing having a first chamber, a second chamber, and a valve seat disposed between said first chamber and said second chamber;
a valve head disposed in said housing and moveable relative to said housing between an open position spaced from said valve seat and a closed position engaged with said valve seat, said valve head defining a bore therethrough along an axis;
a valve stem operatively coupled to said valve head for moving said valve head between said open position and said closed position;
a pressure relief mechanism including a plug coupled to said valve stem and extending along a plug axis in said bore of said valve head, said plug being moveable relative to said valve head from a sealed position preventing fluid communication through said bore to an unsealed position allowing fluid communication through said bore for relieving pressure differences between said first chamber and said second chamber when said valve head is in said closed position;
one of said valve head and said plug defining a groove elongated along said plug axis; and
an intermediate member separate from said plug and said valve head and retained in said groove between said plug and said valve head wherein said groove is sized larger than said intermediate member along said plug axis for allowing selective movement of said plug relative to said valve head between said sealed position and said unsealed position;
a link pivotably connected to said housing and coupled to said valve stem and said plug to transmit movement from said valve stem to said plug; and
wherein said link defines a cam slot and including a pin engaging said valve stem and said cam slot.

14. A valve assembly comprising:
a housing having a first chamber, a second chamber, and a valve seat disposed between said first chamber and said second chamber;
a valve head disposed in said housing and moveable relative to said housing between an open position spaced from said valve seat and a closed position engaged with said valve seat, said valve head defining a bore therethrough along an axis;

a valve stem operatively coupled to said valve head and being rotatably and reciprocally movable along a stem axis for moving said valve head between said open position and said closed position;
a pressure relief mechanism including a plug coupled to said valve stem and extending along a plug axis in said bore of said valve head, said plug being moveable relative to said valve head from a sealed position preventing fluid communication through said bore to an unsealed position allowing fluid communication through said bore for relieving pressure differences between said first chamber and said second chamber when said valve head is in said closed position;
a link disposed within and pivotably connected to said housing and coupled to said valve stem and said plug to transmit movement from said valve stem to said plug;
wherein one of said valve head and said plug includes a first wall and the other of said valve head and said plug includes a second wall defining a groove, said first wall and said second wall are spaced from each other radially and oppose each other radially;
an intermediate member separate from said plug and said valve head and retained in said groove between said plug and said valve head wherein said groove is sized larger than said intermediate member along said plug axis for allowing selective movement of said plug relative to said valve head between said sealed position and said unsealed position;
wherein said first wall engages said intermediate member when the end of said plug contacts a bore seal; and
wherein said intermediate member is spaced from said second wall when said valve stem is in said sealed position and is spaced from said first wall when said valve stem is in said unsealed position.

15. A valve assembly as set forth in claim 14 wherein said valve head includes a tube that defines said bore.

16. A valve assembly as set forth in claim 15 wherein said link defines a cup to receive said plug and said link receives said tube of said valve head between said cup and said plug.

17. A valve assembly as set forth in claim 14 including a pin engaging said link and said valve stem to pivotably couple said link to said valve stem.

18. A valve assembly comprising:
a housing having a first chamber, a second chamber, and a valve seat disposed between said first chamber and said second chamber;
a valve head disposed in said housing and moveable relative to said housing between an open position spaced from said valve seat and a closed position engaged with said valve seat, said valve head defining a bore therethrough along an axis;
a valve stem operatively coupled to said valve head for moving said valve head between said open position and said closed position;
a pressure relief mechanism including a plug coupled to said valve stem and extending along a plug axis in said bore of said valve head, said plug being moveable relative to said valve head from a sealed position preventing fluid communication through said bore to an unsealed position allowing fluid communication through said bore for relieving pressure differences between said first chamber and said second chamber when said valve head is in said closed position;
a link pivotably connected to said housing and coupled to said valve stem and said plug to transmit movement from said valve stem to said plug;
wherein one of said valve head and said plug includes a first wall and the other of said valve head and said plug includes a second wall defining a groove, said first wall and said second wall are spaced from each other radially and oppose each other radially;
an intermediate member separate from said plug and said valve head and retained in said groove between said plug and said valve head wherein said groove is sized larger than said intermediate member along said plug axis for allowing selective movement of said plug relative to said valve head between said sealed position and said unsealed position;
wherein said first wall engages said intermediate member when the end of said plug contacts a bore seal;
wherein said intermediate member is spaced from said second wall when said valve stem is in said sealed position and is spaced from said first wall when said valve stem is in said unsealed position; and
wherein said link defines a cam slot and including a pin engaging said valve stem and said cam slot.

19. A valve assembly comprising:
a housing having a first chamber, a second chamber, and a valve seat disposed between said first chamber and said second chamber;
a valve head disposed in said housing and moveable relative to said housing between an open position spaced from said valve seat and a closed position engaged with said valve seat, said valve head defining a bore therethrough along an axis;
a valve stem operatively coupled to said valve head and being rotatably and reciprocally movable along a stem axis for moving said valve head between said open position and said closed position;
a pressure relief mechanism including a plug coupled to said valve stem and extending along a plug axis in said bore of said valve head, said plug being moveable relative to said valve head from a sealed position preventing fluid communication through said bore to an unsealed position allowing fluid communication through said bore for relieving pressure differences between said first chamber and said second chamber when said valve head is in said closed position;
a link disposed within and pivotably connected to said housing and coupled to said valve stem and said plug to transmit movement from said valve stem to said plug;
wherein said valve head includes a first wall and said plug includes a second wall defining a groove, said first wall and said second wall are spaced from each other radially and oppose each other radially; and
an intermediate member separate from said plug and said valve head and retained in said groove between said plug and said valve head wherein said groove is sized larger than said intermediate member along said plug axis for allowing selective movement of said plug relative to said valve head between said sealed position and said unsealed position.

20. A valve assembly comprising:
a housing having a first chamber, a second chamber, and a valve seat disposed between said first chamber and said second chamber;
a valve head disposed in said housing and moveable relative to said housing between an open position spaced from said valve seat and a closed position engaged with said valve seat, said valve head defining a bore therethrough along an axis;

a threaded actuator operatively coupled to said valve head for moving said valve head between said open position and said closed position;

a pressure relief mechanism including a plug coupled to said threaded actuator and extending along a plug axis in said bore of said valve head, said plug being moveable relative to said valve head from a sealed position preventing fluid communication through said bore to an unsealed position allowing fluid communication through said bore for relieving pressure differences between said first chamber and said second chamber when said valve head is in said closed position;

a link pivotably connected to said threaded actuator and said plug to transmit movement from said valve stem to said plug;

one of said valve head and said plug defining a groove elongated along said plug axis; and an intermediate member separate from said plug and said valve head and retained in said groove between said plug and said valve head wherein said groove is sized larger than said intermediate member along said plug axis for allowing selective movement of said plug relative to said valve head between said sealed position and said unsealed position.

\* \* \* \* \*